(12) United States Patent
Ishizuka

(10) Patent No.: US 8,947,691 B2
(45) Date of Patent: Feb. 3, 2015

(54) PRINTING APPARATUS, METHOD FOR CONTROLLING THE SAME, AND STORAGE MEDIUM

(71) Applicant: Canon Kabushiki Kaisha, Tokyo (JP)

(72) Inventor: Koichi Ishizuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/295,040

(22) Filed: Jun. 3, 2014

(65) Prior Publication Data

US 2014/0362396 A1 Dec. 11, 2014

(30) Foreign Application Priority Data

Jun. 10, 2013 (JP) .................................. 2013-121838

(51) Int. Cl.
*G06F 15/00* (2006.01)
*G06F 3/12* (2006.01)
*G06K 15/00* (2006.01)

(52) U.S. Cl.
CPC ............ *G06F 3/1215* (2013.01); *G06F 3/1268* (2013.01); *G06K 15/404* (2013.01)
USPC ........................................................ 358/1.13

(58) Field of Classification Search
USPC ........................................................ 358/1.13
See application file for complete search history.

(56) References Cited

U.S. PATENT DOCUMENTS

2011/0031677 A1* 2/2011 Ozawa ........................ 270/58.12

FOREIGN PATENT DOCUMENTS

JP 2005-107322 A 4/2005
JP 2008-149686 A 7/2008

* cited by examiner

*Primary Examiner* — Saeid Ebrahimi Dehkordy
(74) *Attorney, Agent, or Firm* — Canon U.S.A., Inc. IP Division

(57) ABSTRACT

A printing apparatus enables specifying a mode shift before execution of a new job to be entered, making it possible to reduce the time period during which a user needs to wait before performing sheet processing.

11 Claims, 15 Drawing Sheets

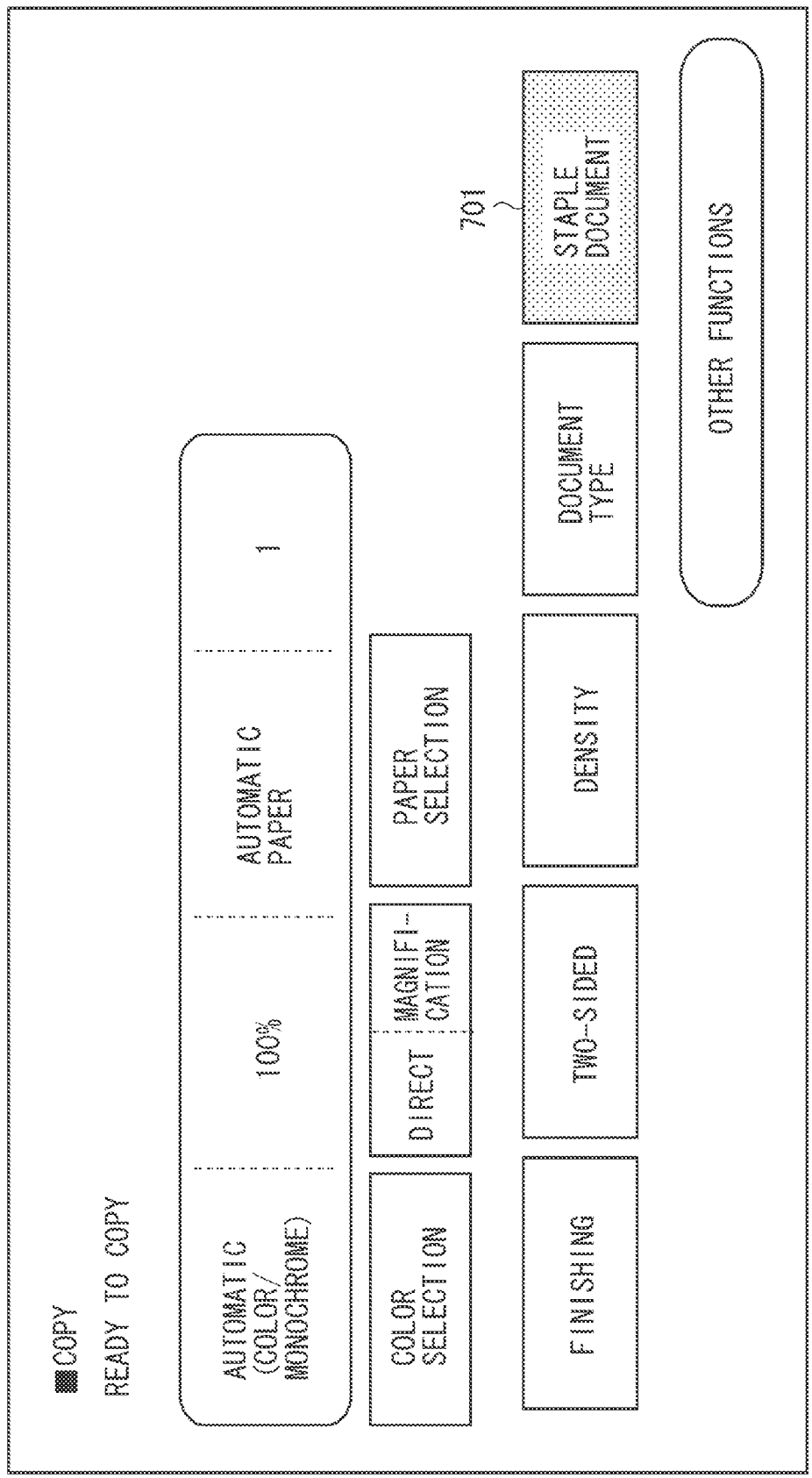

FIG. 13

| JOB 1 | | JOB 2 | | JOB 3 | |
|---|---|---|---|---|---|
| RECORDING SHEET SIZE | A4 | RECORDING SHEET SIZE | A4 | RECORDING SHEET SIZE | A4 |
| NUMBER OF COPIES | 2 | NUMBER OF COPIES | 3 | NUMBER OF COPIES | 3 |
| DENSITY | NORMAL | DENSITY | NORMAL | DENSITY | NORMAL |
| TWO-SIDED PRINTING | ONE-SIDED | TWO-SIDED PRINTING | ONE-SIDED | TWO-SIDED PRINTING | ONE-SIDED |
| POST-PROCESSING | STAPLING (AT UPPER RIGHT) | POST-PROCESSING | NONE | POST-PROCESSING | STAPLING (AT UPPER RIGHT) |
| DOCUMENT STAPLING | ON | DOCUMENT STAPLING | OFF | DOCUMENT STAPLING | OFF |

PRINTING APPARATUS, METHOD FOR CONTROLLING THE SAME, AND STORAGE MEDIUM

BACKGROUND OF THE INVENTION

1. Field of the Invention

The present invention relates to a printing apparatus, a method for controlling the printing apparatus, and a storage medium therefor.

2. Description of the Related Art

There has conventionally been a printing apparatus having a post-processing apparatus. Such a printing apparatus forms an image on each sheet, and conveys sheets with formed images to the post-processing apparatus which performs post-processing on the sheets.

Conventionally, another printing apparatus is known to have not only a function of performing stapling on sheets with images printed thereon by the printing apparatus and then conveyed, but also a function of performing stapling on sheets, which were inserted into a post-processing apparatus by a user, without images printed thereon by the printing apparatus (refer to Japanese Patent Application Laid-Open No. 2005-107322).

Such a printing apparatus uses the same stapler to perform stapling on sheets with images printed thereon by the printing apparatus and then conveyed, and to perform stapling on sheets inserted into a post-processing apparatus by the user. Therefore, the printing apparatus is provided with a print-restriction mode in which printing is restricted to perform stapling on the sheets inserted into the post-processing apparatus to prevent the inserted sheets from contacting a sheet conveyed from the printing apparatus, thus avoiding jam.

Further, there has conventionally been a technique for receiving, if printing for a job is in progress, a reservation for a mode shift to a print-restriction mode, and for shifting the printing apparatus to the mode after completion of printing for the job (refer to Japanese Patent Application Laid-Open No. 2008-149686).

However, with conventional printing apparatuses, if printing for a job is in progress, a user is only able to reserve a mode shift after completion of printing, and is unable to reserve a mode shift for a new job to be entered by the user.

For example, when copying stapled document sheets, the user may once remove staples, place the document sheet bundle on an automatic document feeder (ADF), and instruct the printing apparatus to execute copy. If the user wants to perform stapling on the read document sheet bundle after completion of document reading, the user instructs the printing apparatus to perform the above-described mode shift. However, if the printing apparatus has already started printing at the timing of the instruction, the user needs to wait until printing is completed.

SUMMARY OF THE INVENTION

According to an aspect of the present invention, a printing apparatus includes a printing unit configured to read document images and print images on sheets based on the read images through job execution, a sheet processing unit configured to convey the sheets with images printed thereon by the printing unit to a sheet processing apparatus, and to make the sheet processing apparatus perform sheet processing on the sheets, a changing unit configured to, in a state where image printing by the printing unit is restricted, shift the printing apparatus to a mode in which the sheet processing apparatus is instructed to perform sheet processing on the sheets, a specifying unit configured to, before execution of a new job to be entered, specify a mode shift of the printing apparatus to the mode after completion of printing for a relevant job and before printing for another job starts, and a control unit configured to, when a mode shift to the mode is specified by the specifying unit, control the printing apparatus to shift to the mode after completion of printing for the relevant job and before printing for the another job starts.

Further features of the present invention will become apparent from the following description of exemplary embodiments with reference to the attached drawings.

BRIEF DESCRIPTION OF THE DRAWINGS

FIG. 5 describes a screen according to an exemplary embodiment of the present invention.

FIG. 13 describes a print queue according to an exemplary embodiment of the present invention.

DESCRIPTION OF THE EMBODIMENTS

Various exemplary embodiments, features, and aspects of the invention will be described in detail below with reference to the drawings.

Figure 1:
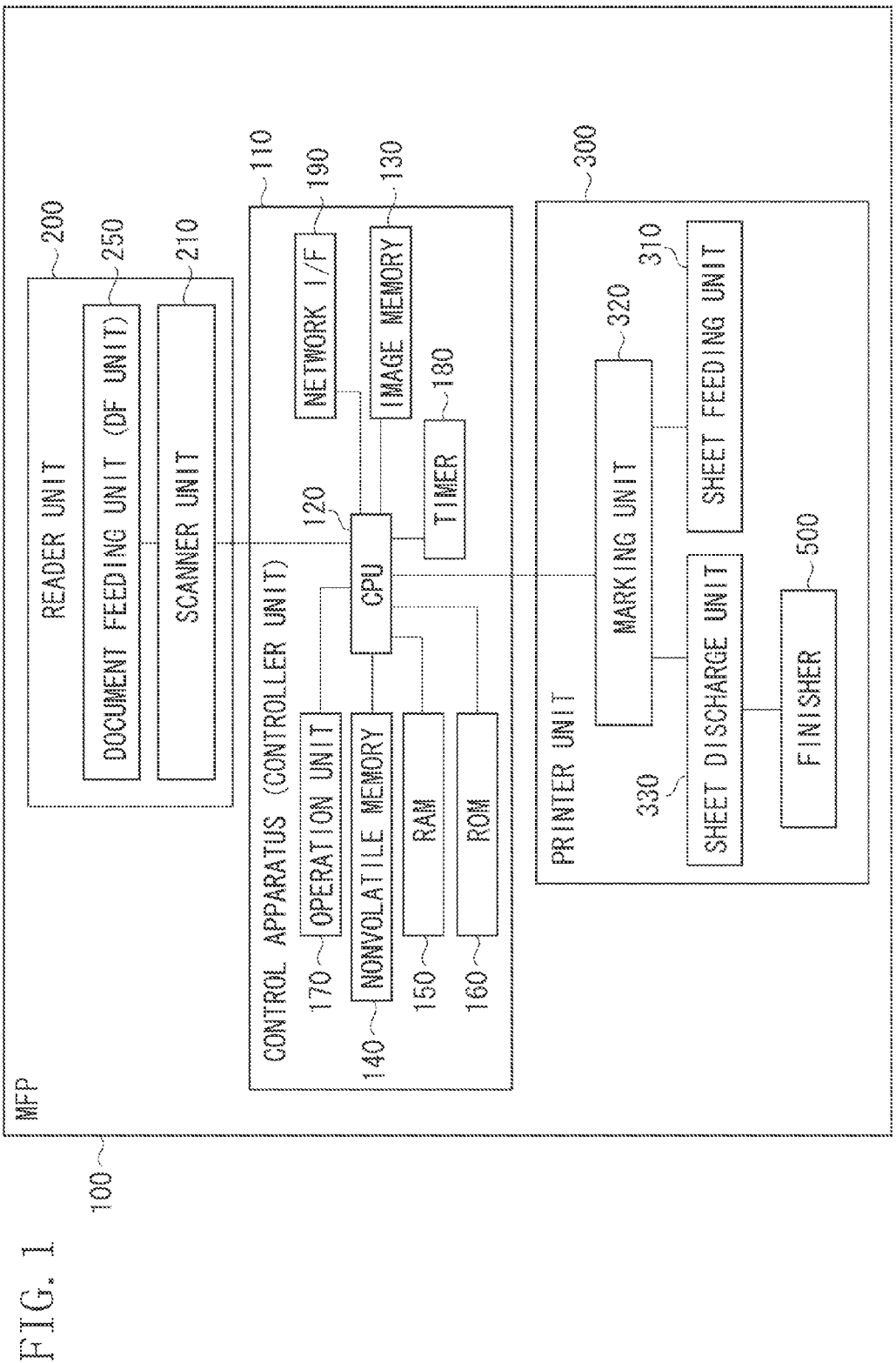
FIG. 1 is a block diagram illustrating a configuration of an image forming apparatus according to an exemplary embodiment of the present invention.

FIG. 1 is a block diagram illustrating a configuration of a multifunctional peripheral (MFP) which is an example of a printing apparatus (image forming apparatus) according to a present exemplary embodiment.

A MFP 100 according to the present exemplary embodiment includes a control apparatus 110, a reader unit 200, and a printer unit 300. The reader unit 200, the control apparatus 110, and the printer unit 300 are electrically connected with one another, and mutually send and receive control commands and data. A finisher 500 can be connected to the MFP 100.

The control apparatus 110 includes a central processing unit (CPU) 120, an image memory 130, a nonvolatile memory 140, a random access memory (RAM) 150, a read only memory (ROM) 160, an operation unit 170, and a timer 180.

The CPU 120 loads a program stored in the ROM 160 into the RAM 150, and executes it to totally control the MFP 100.

The image memory 130 stores image data read by the reader unit 200. The stored image data is transferred to the printer unit 300 by an instruction from the CPU 120.

The RAM 150 functions as a work area for the CPU 120, and stores various programs and data.

The ROM 160 stores various programs to be read and executed by the CPU 120.

The nonvolatile memory 140 is a mass storage memory for storing various programs and image data. Although, in the present exemplary embodiment, a hard disk drive (HDD) is used as an example of the nonvolatile memory 140, any memory having a sufficient capacity for storing image data, such as a Blu-ray disc, may be used as the nonvolatile memory 140.

The operation unit 170 includes a display unit and hard keys. The display unit is provided with a liquid crystal display and a touch panel sheet stuck on the liquid crystal display. Operation screens and statuses of the MFP 100 are displayed on the liquid crystal display. The operation unit 170 receives user operations via the operation screens or the hard keys.

The timer 180 is used to measure time.

A network interface (I/F) 190 performs control to enable the MFP 100 to communicate with an external apparatus, such as a personal computer (PC) and another MFP, via a network.

The reader unit 200 includes a scanner unit 210 for reading a document image and generating image data indicating the read image, and a document feeding unit 250 for conveying a document to be read by the scanner unit 210.

The printer unit 300 feeds each of recording sheets stored in a sheet feeding unit 310, and conveys each sheet to a marking unit 320. The printer unit 300 controls the marking unit 320 to print an image on the fed recording sheet based on the image data. Then, the printer unit 300 discharges onto a sheet discharge unit 330 the recording sheet with a printed image. The marking unit 320 may employ the electrophotographic process, the ink-jet process, and any other processes which enable image printing.

The MFP 100 performs a plurality of types of jobs (describe below).

For example, the MFP 100 performs a copy job in which image data indicating document images read by the reader unit 200 are stored in the image memory 130, and relevant images are printed by the printer unit 300 based on the image data stored in the image memory 130.

The MFP 100 also performs a print job in which image data and print settings received via the network I/F 190 are stored in the image memory 130, and relevant images are printed by the printer unit 300 based on the image data and the print settings stored in the image memory 130.

The MFP 100 also performs a data transmission job in which image data indicating document images read by the reader unit 200 is stored in the image memory 130, and the image data stored in the image memory 130 is transmitted to an external apparatus via the network I/F 190.

The MFP 100 also performs a scan-and-storage job in which image data indicating document images read by the reader unit 200 is stored in the nonvolatile memory 140.

The MFP 100 further performs a box print job in which images based on image data stored in the nonvolatile memory 140 are printed in response to a print instruction from the operation unit 170.

The finisher 500 receives sheets with images printed thereon by the MFP 100, and performs stapling and saddle stitch bookbinding processing on the sheets.

Figure 2:
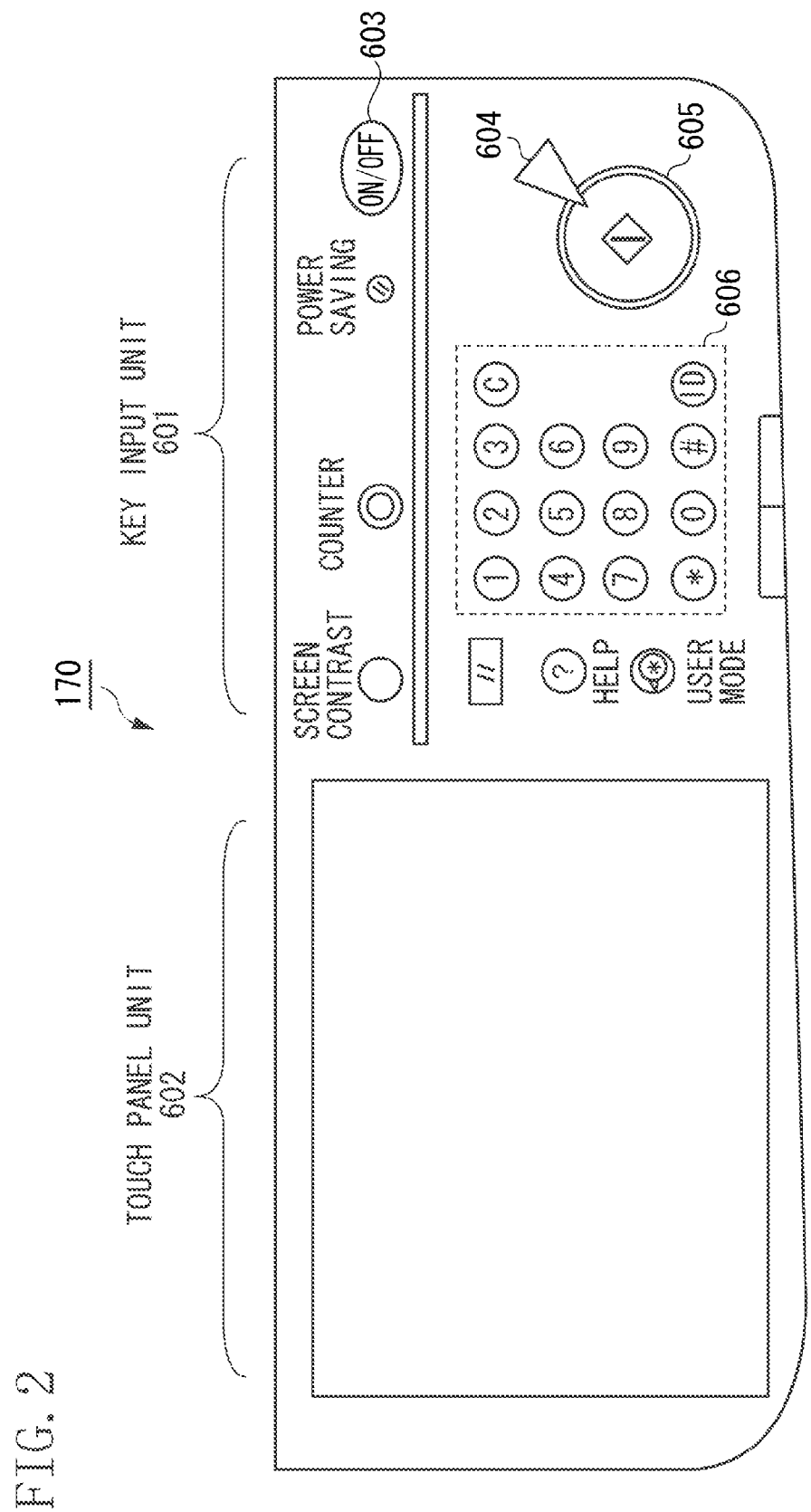
FIG. 2 illustrates a configuration of an operation unit according to an exemplary embodiment of the present invention.

FIG. 2 illustrates the operation unit 170 included in the MFP 100 illustrated in FIG. 1.

The operation unit 170 includes a key input unit 601 for receiving a user operation by using the hard keys, and a touch panel unit 602 for displaying soft keys (display keys) and receiving a user operation performed by using the relevant soft keys.

The key input unit 601 will be described below. As illustrated in FIG. 2, the key input unit 601 is provided with an operation unit power switch 603. When the user presses the operation unit power switch 603 when the MFP 100 is in a standby mode (normal operation state), the CPU 120 switches the MFP 100 from the standby mode to a sleep mode (in which power consumption is lowered). On the other hand, when the user presses the operation unit power switch 603 when the MFP 100 is in the sleep mode, the CPU 120 switches the MFP 100 from the sleep mode to the standby mode.

A start key 605 is used to receive from the user an instruction for making the MFP 100 perform a copy operation and a data transmission operation.

A stop key 604 is used to receive from the user an instruction for interrupting the copy operation and the data transmission operation.

A numeric keypad 606 is used by the user to input various settings.

The touch panel unit 602 will be described below. The touch panel unit 602 is provided with a liquid crystal display (LCD) and a touch panel sheet having a transparent electrode stuck thereon.

The touch panel unit 602 has a function of receiving various settings from the user, and a function of presenting information to the user.

Figure 3:
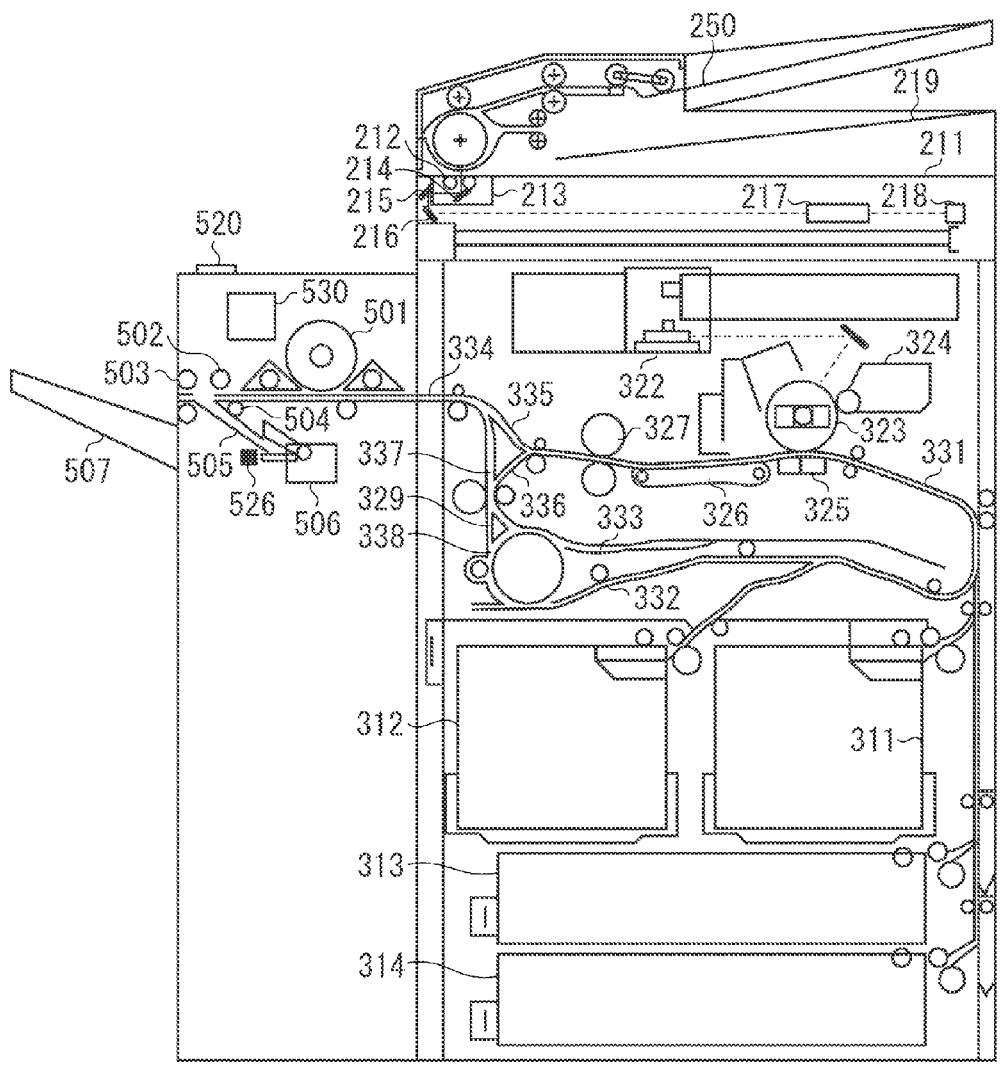
FIG. 3 is a sectional view illustrating a configuration of an image forming apparatus according to an exemplary embodiment of the present invention.

FIG. 3 is a sectional view illustrating the MFP 100 illustrated in FIG. 1.

The document feeding unit 250 of the reader unit 200 feeds each of document sheets set on a document positioning plate, and conveys each sheet to an optical unit 213. The document sheet conveyed to the optical unit 213 is discharged onto a sheet discharge tray 219.

When the document sheet is conveyed onto the optical unit 213, the reader unit 200 turns ON a lamp 212, and irradiates the document sheet with light from the optical unit 213. At this timing, reflected light from the document sheet is guided to a charge coupled device (CCD) image sensor (hereinafter referred to simply as a CCD) 218 via mirrors 214, 215, and 216, and a lens 217. Then, the CCD 218 reads a document image, and outputs image data. The image data output from the CCD 218 undergoes predetermined processing, and then is transmitted to the control apparatus 110.

The reader unit 200 reads an image of a document sheet placed between the document feeding unit 250 and a platen glass 211. In that case, the reader unit 200 turns ON the lamp 212 and moves the optical unit 213. At this timing, reflected light from the document is guided to the CCD 218 via the mirrors 214, 215, and 216, and the lens 217. Then, the CCD 218 reads a document image, and outputs image data. The image data output from the CCD 218 undergoes predetermined processing, and then is transmitted to the control apparatus 110.

In the printer unit 300, a laser driver drives a laser light emitting unit 322 to emit a laser beam according to the image data output from the control apparatus 110. A photosensitive drum 323 is irradiated with this laser beam, and a latent image according to the laser beam is formed on the photosensitive drum 323. A developing unit 324 applies developer to the portion of the latent image on the photosensitive drum 323.

The printer unit 300 includes cassettes 311 to 314 having a drawer shape as the sheet feeding unit 310.

The printer unit 300 feeds a recording sheet from any one of the cassettes 311 to 314, and conveys it to a transfer unit 325 via a conveyance path 331. The transfer unit 325 transfers onto the recording sheet the developer adhered to the photosensitive drum 323.

A conveyance belt 326 conveys to a fixing unit 327 the recording sheet with the developer transferred thereon. The fixing unit 327 fixes the developer to the recording sheet by using heat and pressure. Then, the recording sheet that has passed through the fixing unit 327 is conveyed via conveyance paths 335 and 334, and then is discharged. When the print side of the recording sheet is to be reversed before discharging, the recording sheet is guided to a conveyance path 338 via a conveyance path 336. From the conveyance path 338, the recording sheet is conveyed in a reverse direction, and can be conveyed via a conveyance path 337 and the conveyance path 334.

When two-sided printing is set, the recording sheet passes through the fixing unit 327 and the conveyance path 336, and is guided to a conveyance path 333 by a flapper 329. Then, the recording sheet is conveyed in the reverse direction, guided to the conveyance path 338 by the flapper 329, and then guided to a re-feeding conveyance path 332. The recording sheet guided to the re-feeding conveyance path 332 passes through the conveyance path 331 at the above-described timing, and is conveyed to the transfer unit 325. Developer is transferred onto the second side of the recording sheet by the transfer unit 325. Then, the recording sheet is guided to the conveyance path 334 via the fixing unit 327.

The recording sheet conveyed via the conveyance path 334 will be conveyed to the finisher 500 regardless of one-sided printing or two-sided printing.

In the finisher 500, the conveyed recording sheet is firstly sent to a buffer unit 501. The buffer unit 501 winds, as needed, the conveyed recording sheet around a buffer roller to perform buffering. For example, if stapling or other processing to be performed on the downstream side takes time, the conveyance interval of recording sheets conveyed from the main unit can be adjusted by using the buffer unit 501.

Then, the recording sheet is conveyed via a conveyance path 504 by an upstream discharge roller pair 502 and a downstream discharge roller pair 503, and then stacked on a stack tray 505. When a recording sheet bundle for one copy has been stacked on the stack tray 505, the stacked recording sheet bundle is discharged onto a sheet discharge tray 507.

When shifted discharge is specified, the recording sheet bundle stacked on the stack tray 505 is shifted with respect to the recording sheet bundle that was last discharged on the discharging tray 507, making it easier for the user to recognize delimiting portions between recording sheet bundles.

When stapling is specified, a stapling unit 506 performs stapling processing on a bundle of recording sheets conveyed by the upstream discharge roller pair 502, and conveyed via the conveyance path 504 and stacked on the stack tray 505 by the downstream discharge roller pair 503. The stapled recording sheet bundle is discharged onto the discharging tray 507 by the downstream discharge roller pair 503.

In the present exemplary embodiment, a function of performing stapling on recording sheets with images printed thereon by the printer unit 300 and conveyed via the conveyance path 334 is referred to as an in-line stapling function.

The MFP 100 is provided with a manual stapling function in addition to the in-line stapling function.

The manual stapling function is a function of performing stapling on a sheet bundle without image printing by the marking unit 320. The manual stapling function is useful in performing stapling on a bundle of sheets on which images have already been printed.

When using the manual stapling function, the user shifts the MFP 100 to the manual stapling mode, inserts sheets into the stack tray 505, and makes the MFP 100 perform stapling.

Procedures will be described in detail below with reference to FIGS. 4A and 4B.

Figure 4A:
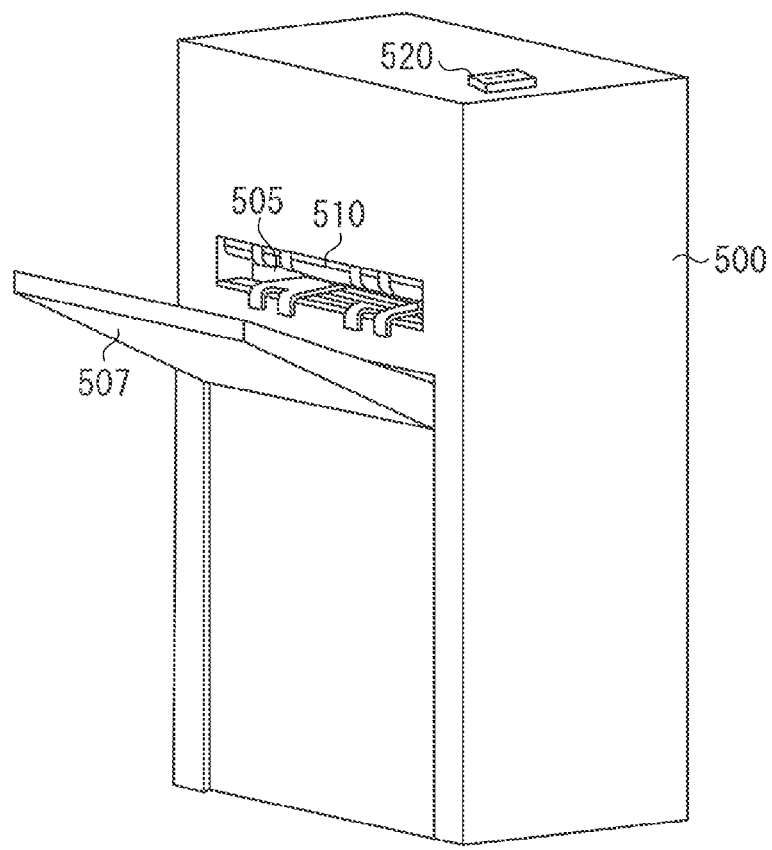
FIGS. 4A and 4B are external views illustrating a configuration of a finisher according to an exemplary embodiment of the present invention.
Figure 4B:
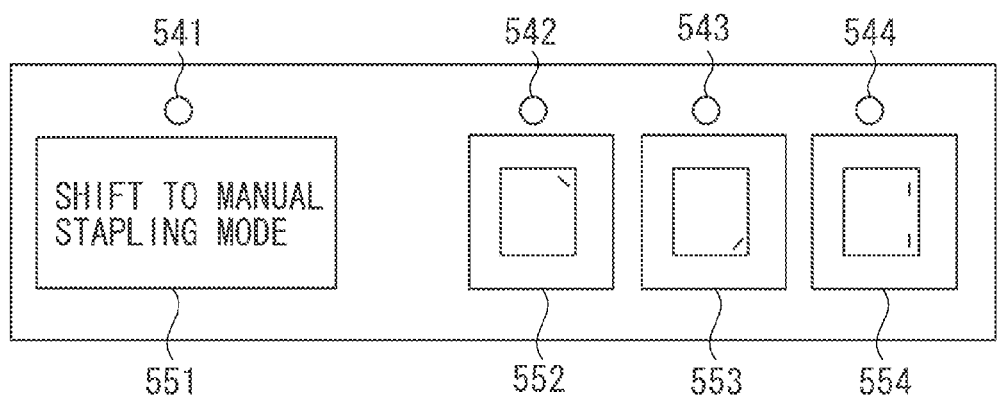

FIG. 4A illustrates an appearance of the finisher 500 described with reference to FIG. 3. FIG. 4B is a top view illustrating an operation panel 520 provided by the finisher 500.

The user presses a SHIFT TO MANUAL STAPLING MODE button 551 of the operation panel 520 to enable a mode shift of the MFP 100 from the normal mode (printing mode) to the manual stapling mode. The manual stapling mode refers to a mode in which the CPU 120 detects that a sheet bundle is inserted into a sheet discharge slot 510 by using a detection sensor 526, and, upon detection of sheet insertion, performs stapling on the sheet bundle.

When the user presses the SHIFT TO MANUAL STAPLING MODE button 551, a signal indicating that the SHIFT TO MANUAL STAPLING MODE button 551 is pressed is sent from the finisher 500 to the CPU 120. Upon reception of this signal, the CPU 120 determines that the user has issued an instruction for a mode shift to the manual stapling mode, and shifts the MFP 100 to the manual stapling mode.

When the MFP 100 shifts to the manual stapling mode and then the detection sensor 526 detects the sheet bundle, the finisher 500 performs stapling on the sheet bundle on the stack tray 505 by using the stapling unit 506.

The use of the manual stapling mode enables performing stapling on a sheet bundle without letting each sheet pass through the transfer unit 325 and the fixing unit 327 for image formation.

While the MFP 100 is in the manual stapling mode, the CPU 120 inhibits execution of printing by the MFP 100. This is because the recording sheet with an image printed thereon by the MFP 100 and conveyed may collide with the sheet bundle inserted into the sheet discharge slot 510 by the user.

A mode light emitting diode (LED) 541 of the operation panel 520 notifies the user of the current mode of the MFP 100. The LED 541 is OFF when the MFP 100 is in the normal mode, and ON when the MFP 100 is in the manual stapling mode.

An upper right stapling button 552, a lower right stapling button 553, and a 2-position binding button 554 function as position designation buttons which can be pressed when the MFP 100 is in the manual stapling mode. The user presses these buttons to specify a stapling position on the sheet. The upper right stapling button 552 is pressed to specify stapling at the upper right position on the sheet. When the position designation button 552 is pressed, the CPU 120 stores "upper right" in the nonvolatile memory 140 as a stapling position, and turns ON the upper right stapling LED 542. The position designation button 553 is pressed to specify stapling at the lower right position on the sheet. When the lower right stapling button 553 is pressed, the CPU 120 stores "lower right" in the nonvolatile memory 140 as a stapling position, and turns ON the lower right stapling LED 543. The 2-position binding button 554 is pressed to specify stapling at two positions on the right-hand side of the sheet. When the position designation button 554 is pressed, the CPU 120 stores "2-position binding" in the nonvolatile memory 140 as a stapling position, and turns ON the 2-position binding LED 544. The user is able to recognize which position is specified by monitoring the lighting state of each LED.

Figure 8:
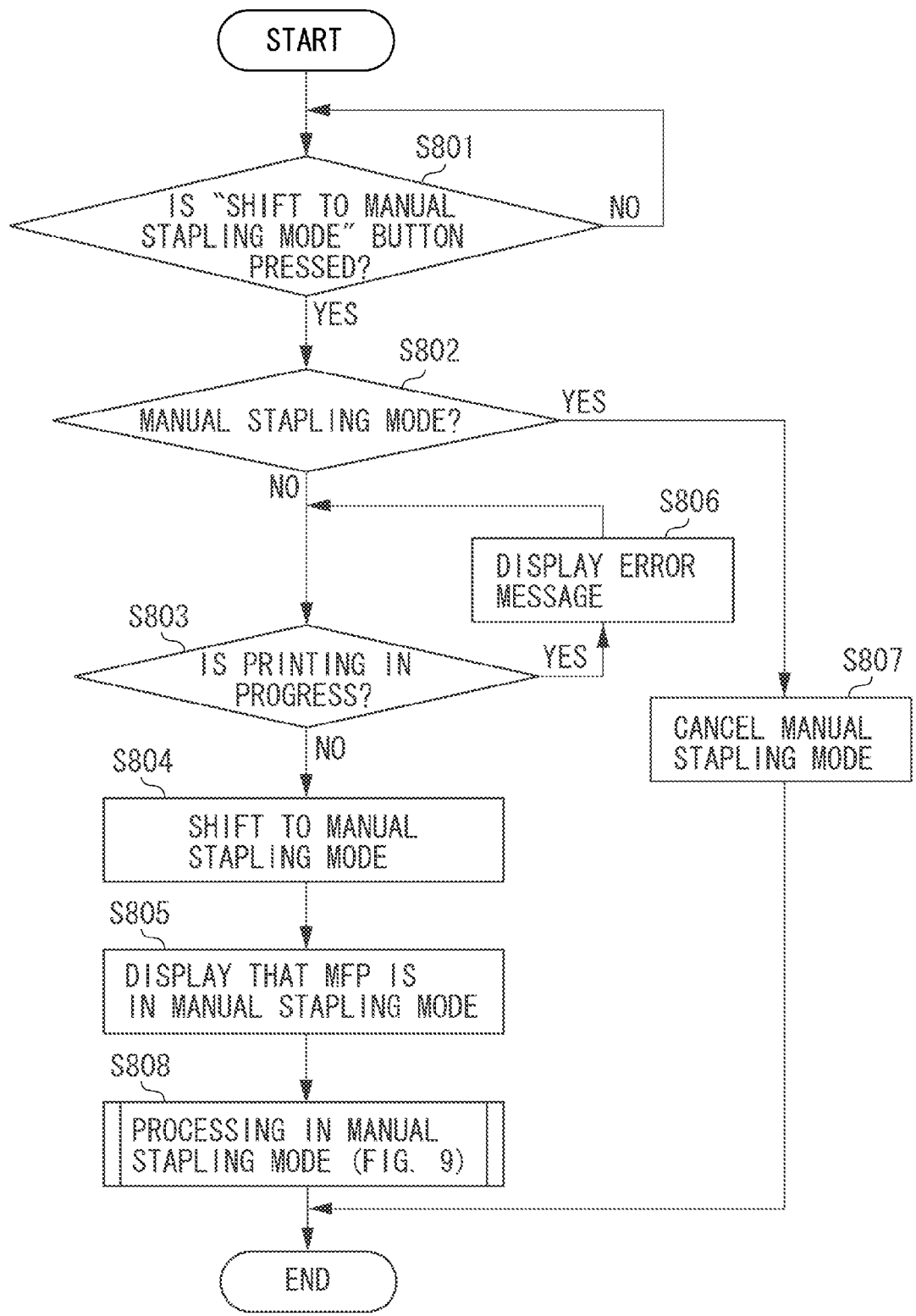
FIG. 8 is a flowchart illustrating processing according to an exemplary embodiment of the present invention.

Processing performed by the CPU 120 when the SHIFT TO MANUAL STAPLING MODE button 551 is pressed will be described below with reference to the flowchart illustrated in FIG. 8. The processing of the flowchart illustrated in FIG. 8 is implemented when the CPU 120 reads a program stored in the ROM 160 into the RAM 150 and then executes it.

In step S801, the CPU 120 determines whether the SHIFT TO MANUAL STAPLING MODE button 551 is pressed. The CPU 120 repeats processing in step S801 until the SHIFT TO MANUAL STAPLING MODE button 551 is determined to be pressed. When the SHIFT TO MANUAL STAPLING MODE button 551 is determined to be pressed (YES in step S801), the CPU 120 advances the processing to step S802.

In step S802, the CPU 120 determines whether the MFP 100 is in the manual stapling mode. When the MFP 100 is determined to be in the manual stapling mode (YES in step S802), the CPU 120 advances the processing to step S807. On the other hand, when the MFP 100 is determined to be not in the manual stapling mode (NO in step S802), the CPU 120 advances the processing to step S803.

In step S807, the CPU 120 cancels the manual stapling mode of the MFP 100, and ends the processing of this flowchart. More specifically, the CPU 120 permits printing. Even when the CPU 120 detects that a sheet bundle is inserted into the sheet discharge slot 510 by the detection sensor 526, stapling is not performed on the sheet bundle.

In step S803, the CPU 120 determines whether the MFP 100 is currently performing printing. When the MFP 100 is determined to be currently performing printing (YES in step S803), the CPU 120 advances the processing to step S806. On the other hand, when the MFP is determined to be not currently performing printing (NO in step S803), the CPU 120 advances the processing to step S804.

In step S804, the CPU 120 shifts the MFP 100 to the manual stapling mode.

Figure 6:
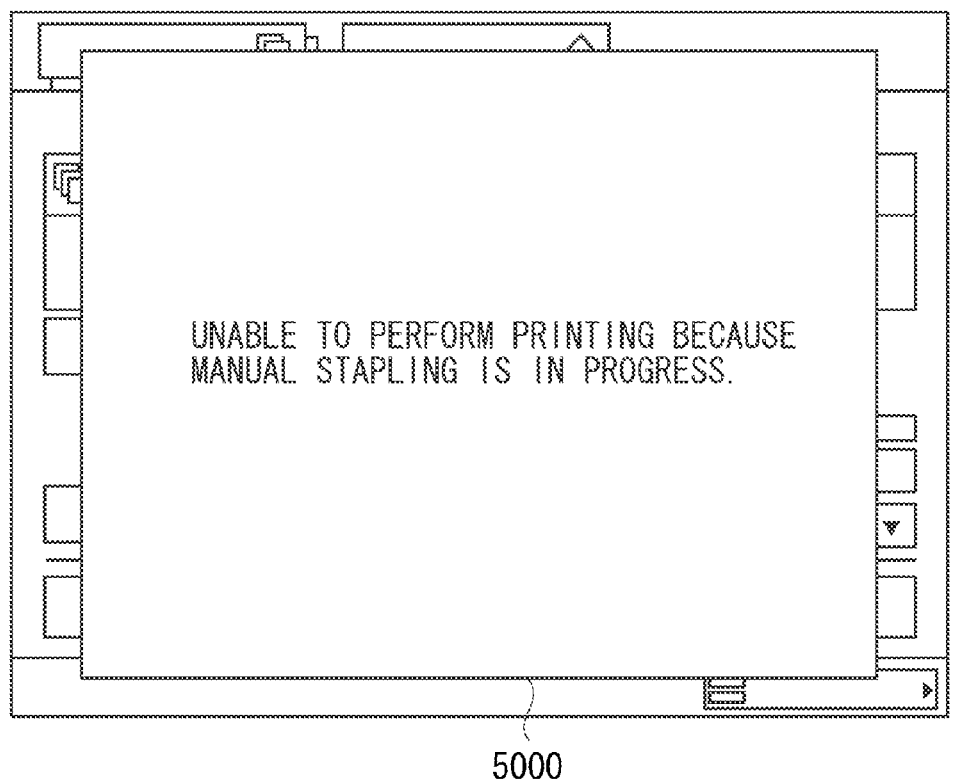
FIG. 6 describes a screen according to an exemplary embodiment of the present invention.

In step S805, since the MFP 100 is in the manual stapling mode, the CPU 120 displays a message 5000 indicating that printing cannot be performed on the touch panel unit 602 of the MFP 100, as illustrated in FIG. 6, and advances the processing to step S808.

In step S808, the CPU 120 performs processing in the manual stapling mode. The processing in the manual stapling mode will be described in detail below with reference to FIG. 9.

Figure 7:
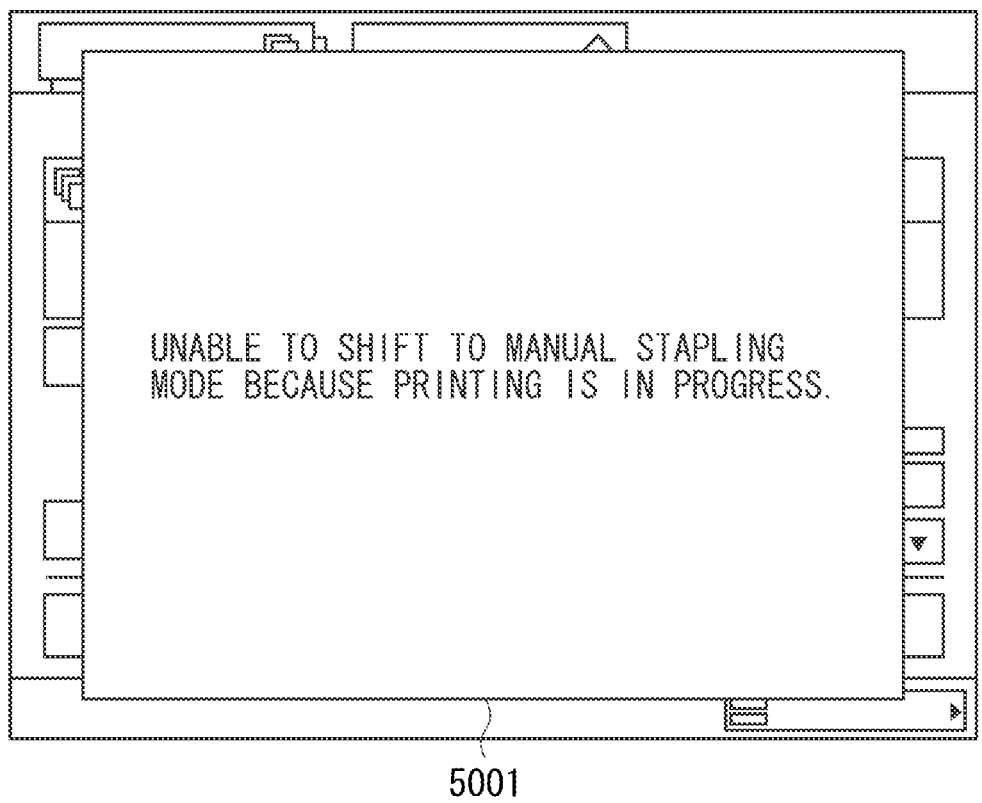
FIG. 7 describes a screen according to an exemplary embodiment of the present invention.

In step S806 (when the CPU 120 advances the processing to step S806 from step S803), since printing is in progress, the CPU 120 displays a message 5001 indicating that the MFP 100 cannot shift to the manual stapling mode, as illustrated in FIG. 7. The CPU 120 may display on the screen a message "insert sheets into sheet discharge slot of finisher".

Figure 9:
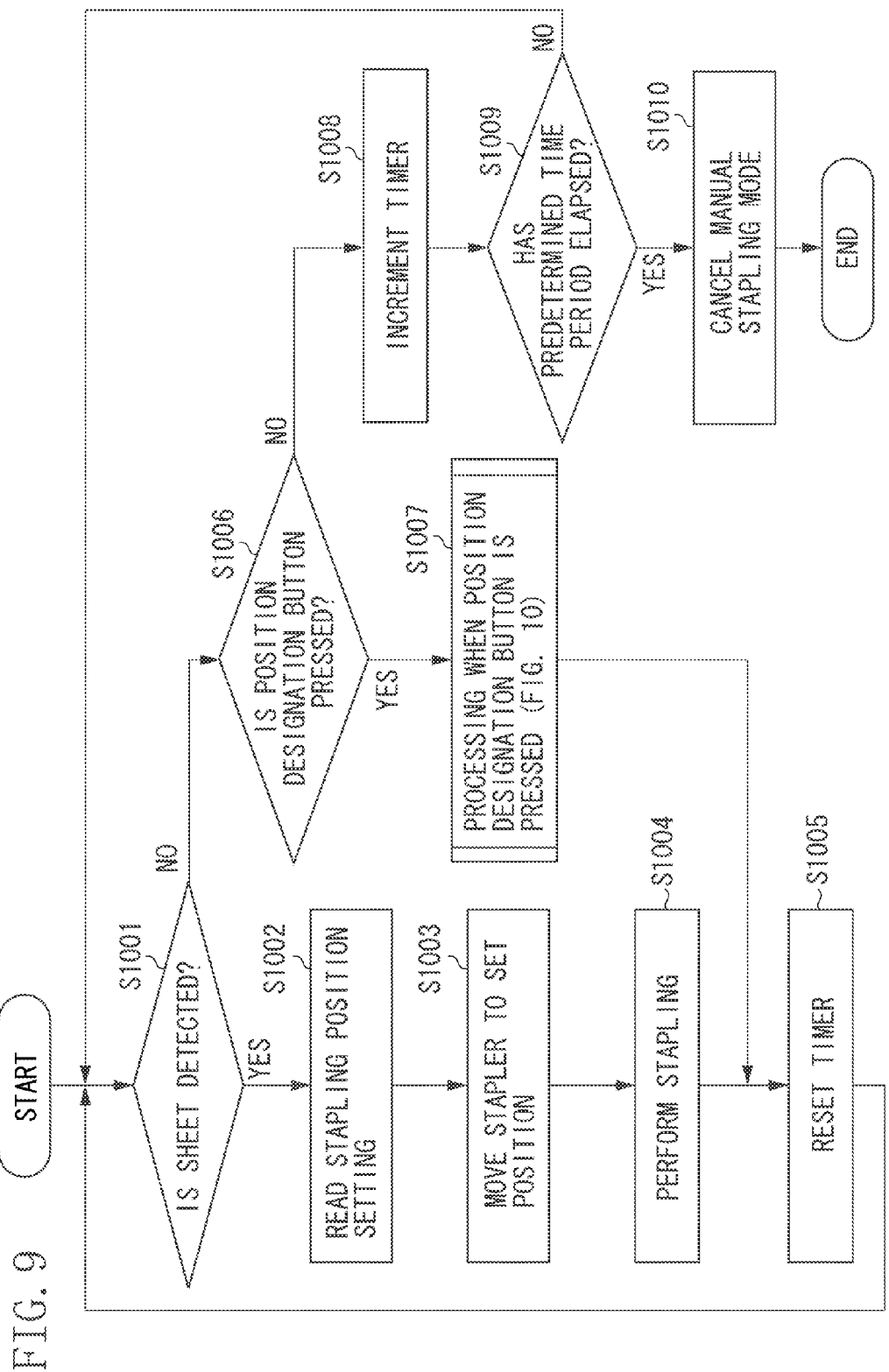
FIG. 9 is a flowchart illustrating processing according to an exemplary embodiment of the present invention.

Operations of the MFP 100 in the manual stapling mode will be described below with reference to the flowchart illustrated in FIG. 9. The processing of the flowchart illustrated in FIG. 9 is performed when the CPU 120 reads a program stored in the ROM 160 into the RAM 150, and then executes it.

In step S1001, the CPU 120 determines whether a sheet bundle is detected by the detection sensor 526 of the stack tray 505. When a sheet bundle is determined to be detected (YES in step S1001), the CPU 120 advances the processing to step S1002. On the other hand, when a sheet bundle is determined to be not detected (NO in step S1001), the CPU 120 advances the processing to step S1006.

In step S1002, the CPU 120 reads the stapling position stored in the nonvolatile memory 140.

In step S1003, the CPU 120 moves the stapler to the read stapling position.

In step S1004, the CPU 120 performs stapling on the sheet bundle by using the stapler.

In step S1005, the CPU 120 resets the value of the timer 180 to 0.

In step S1006, the CPU 120 determines whether any one of the position designation buttons 552 to 554 is pressed. When any one of the position designation buttons 552 to 554 is determined to be pressed (YES in step S1006), then in step S1007, the CPU 120 performs processing when a position designation button is pressed. Such processing will be described below with reference to FIG. 10. On the other hand, when none of the position designation buttons 552 to 554 is determined to be pressed (NO in step S1006), the CPU 120 advances the processing to step S1008.

In step S1008, the CPU 120 increments a value of the timer 180.

In step S1009, referring to the value of the timer 180, the CPU 120 determines whether a predetermined time period has elapsed in a state where no sheet bundle is detected. When the predetermined time period is determined to have elapsed (YES in step S1009), the CPU 120 advances the processing to step S1010. On the other hand, when the predetermined time period is determined to have not elapsed (NO in step S1009), the CPU 120 returns the processing to step S1001.

In step S1010, the CPU 120 cancels the manual stapling mode, and ends the processing of this flowchart. The processing enables preventing the manual stapling mode from being continued and therefore preventing printing restriction for an excessively prolonged period of time, although no sheet bundle is detected and none of the position designation buttons is pressed.

Processing performed by the CPU 120 when each of the position designation buttons 552 to 554 is pressed will be described below with reference to the flowchart illustrated in FIG. 10. The processing of the flowchart illustrated in FIG. 10 is implemented when the CPU 120 reads a program stored in the ROM 160 into the RAM 150, and then executes it.

Figure 10:
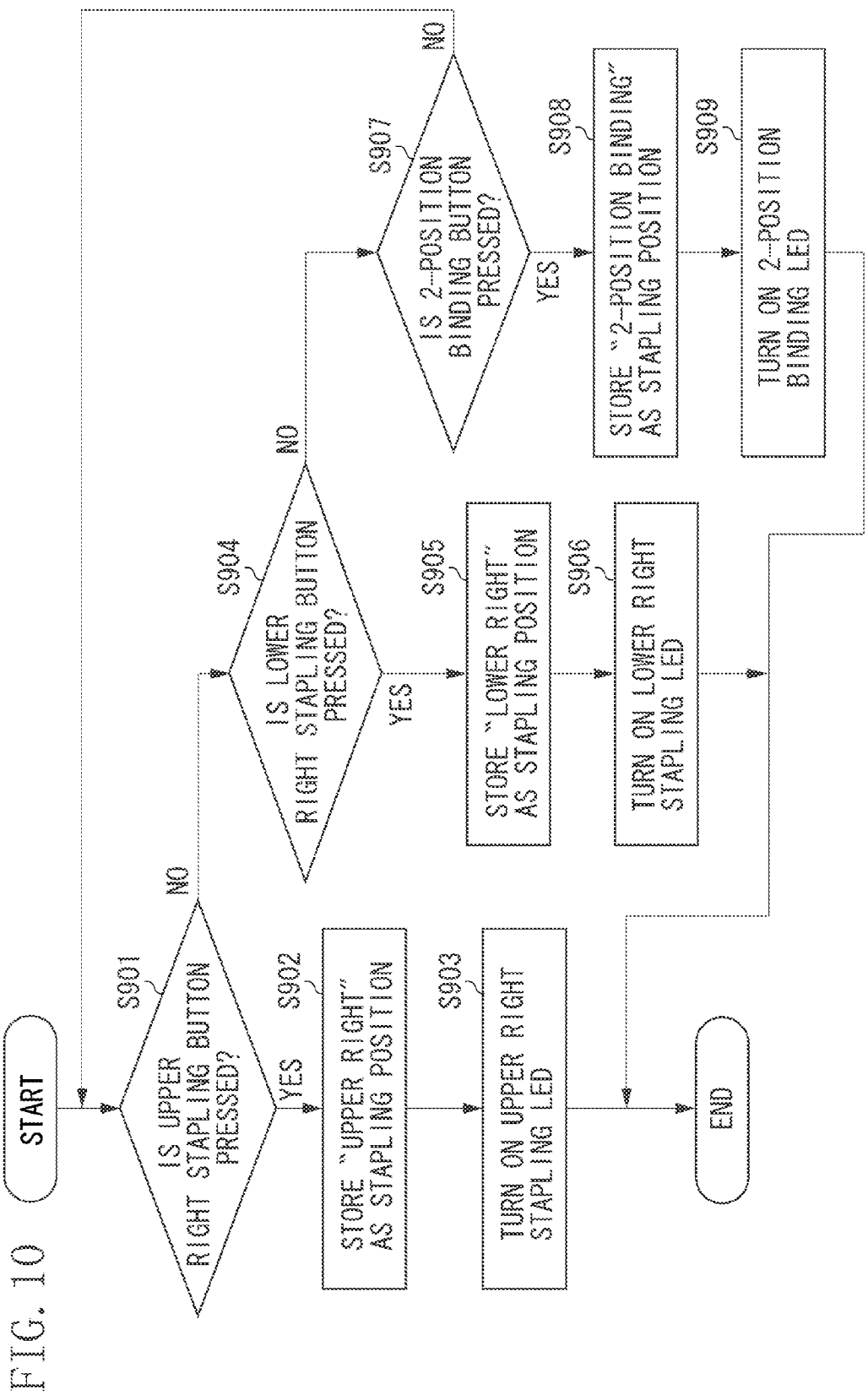
FIG. 10 is a flowchart illustrating processing according to an exemplary embodiment of the present invention.

In step S901 illustrated in FIG. 10, the CPU 120 determines that the upper right stapling button 552 is pressed. When the upper right stapling button 552 is determined to be pressed (YES in step S901), the CPU 120 advances the processing to step S902.

In step S902, the CPU 120 stores "upper right" in the nonvolatile memory 140 as a stapling position. In step S903, the CPU 120 turns ON the upper right stapling LED 542, and ends the processing of this flowchart.

On the other hand, when the upper right stapling button 552 is determined to be not pressed (NO in step S901), then in step S904, the CPU 120 determines whether the lower right stapling button 553 is pressed. When the lower right stapling button 553 is determined to be pressed (YES in step S904), then in step S905, the CPU 120 stores "lower right" in the nonvolatile memory 140 as a stapling position. In step S906, the CPU 120 turns ON the lower right stapling LED 543, and ends the processing of this flowchart.

On the other hand, when the lower right stapling button 553 is determined to be not pressed (NO in step S904), then in step S907, the CPU 120 determines whether the 2-position binding button 554 is pressed. When the 2-position binding button 554 is determined to be pressed (YES in step S907), then in step S908, the CPU 120 stores "2-position binding" in the nonvolatile memory 140 as a stapling position. In step S909, the CPU 120 turns ON the 2-position binding LED 544, and ends the processing of this flowchart.

On the other hand, when the 2-position binding button 554 is determined to be not pressed (NO in step S907), the CPU 120 returns the processing to step S901.

The above-described control enables the user to perform stapling on sheets by using the finisher 500 without performing printing by the MFP 100.

The following use-cases using such MFP 100 can be considered.

In one case, the user removes staples binding a plurality of document sheets, sets the document sheets on the document feeding unit 250, executes a copy job for copying document images, and then performs stapling on the document sheets to restore them to the original state.

In this case, if the MFP 100 receives a print job during execution of a copy job received from the user, the CPU 120 registers the print job in a print queue, and shifts the MFP 100 to an execution wait state. Upon completion of the copy job currently being executed, a conventional MFP immediately starts printing for another job. Therefore, the user is unable to shift the MFP to a mode for performing stapling on the document until execution of the another job has been completed.

In particular, the time period during which the user needs to wait increases with increasing the number of pages of the another print job.

Therefore, in the present exemplary embodiment, the user is able to reserve the manual stapling mode before execution of a copy job starts. Thus, the present exemplary embodiment is directed to providing a mechanism for smoothly shifting the MFP 100 to the manual stapling mode after execution of the copy job starts and before another print job is executed, allowing the user to staple the document.

FIG. 5 illustrates a copy job setting screen (COPY setting screen) displayed on the touch panel unit 602.

While the COPY setting screen is displayed, the user is able to operate the key input unit 601 to input settings, such as the number of copies, copy magnification, recording paper selection, and density.

The CPU 120 receives the settings and stores them in the RAM 150 as copy job settings, and reads the settings as required.

By pressing a STAPLE DOCUMENT button 701 on the COPY setting screen, the user is able to, before execution of the copy job starts, reserve a mode shift of the MFP 100 to the manual stapling mode after execution of the copy job.

Figure 11:
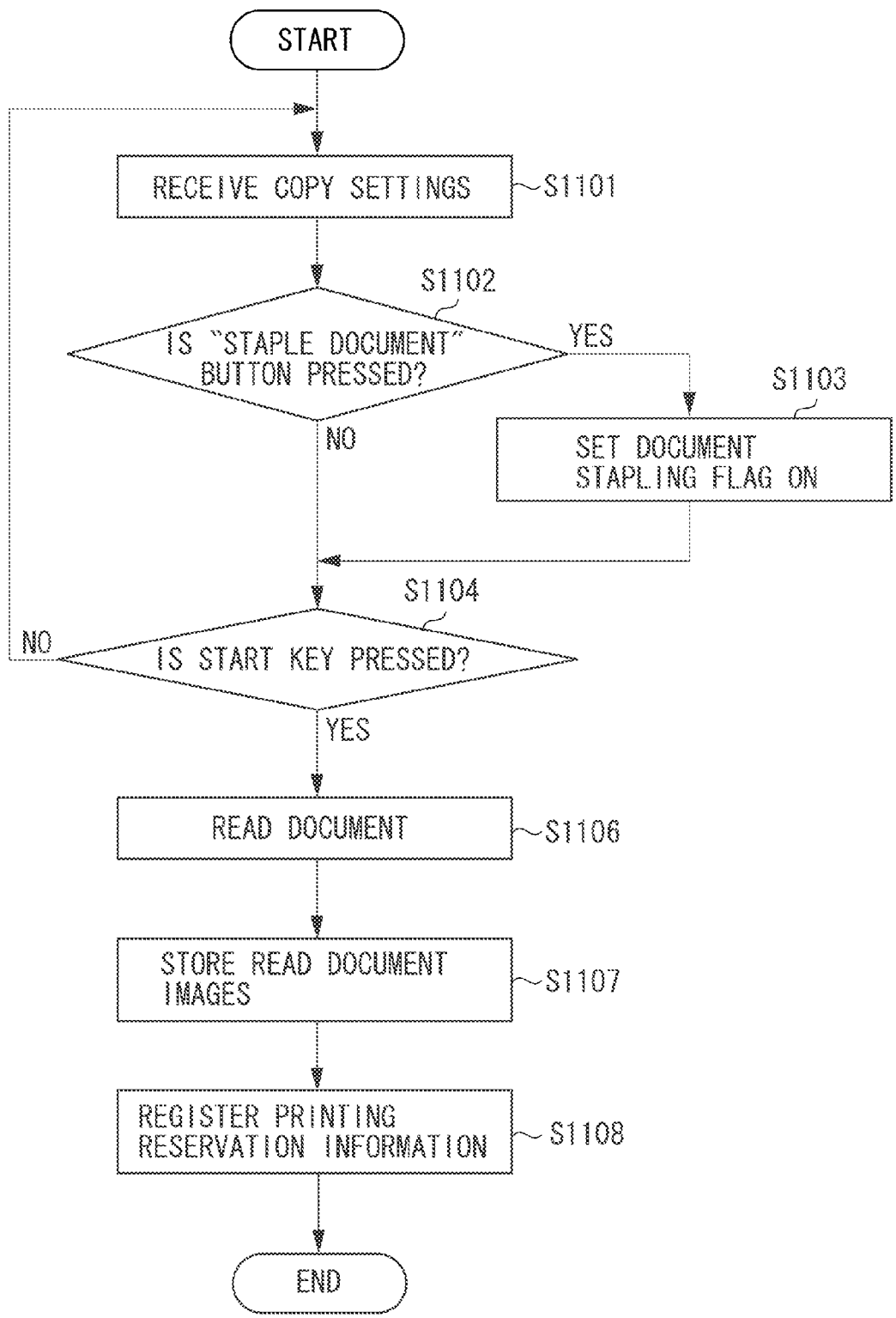
FIG. 11 is a flowchart illustrating processing according to an exemplary embodiment of the present invention.

FIG. 11 is a flowchart illustrating an operation performed by the MFP 100 upon reception of settings of a new copy job to be entered. The processing of the flowchart illustrated in FIG. 11 is implemented when the CPU 120 reads a program stored in the ROM 160 into the RAM 150, and then executes it.

In step S1101, the CPU 120 receives copy settings via the COPY setting screen illustrated in FIG. 5. The CPU 120 stores the received settings in the RAM 150.

In step S1102, the CPU 120 determines whether the STAPLE DOCUMENT button 701 in the COPY setting screen illustrated in FIG. 5 is pressed. When the STAPLE DOCUMENT button 701 is determined to be pressed (YES in step S1102), then in step S1103, the CPU 120 sets ON a document stapling flag for a new copy job to be entered.

In step S1104, the CPU 120 determines whether the start key 605 on the key input unit 601 is pressed. When the start key 605 is determined to be not pressed (NO in step S1104), the CPU 120 returns the processing to step S1101. On the other hand, when the start key 605 is determined to be pressed (YES in step S1104), the CPU 120 advances the processing to step S1106.

In step S1106, the CPU 120 instructs the reader unit 200 to read document sheets to obtain image data indicating document images.

In step S1107, the CPU 120 stores in the image memory 130 the image data obtained by reading the document.

In step S1108, based on the copy settings received in step S1101, the CPU 120 registers relevant printing reservation information in the print queue in the nonvolatile memory 140. The print queue is used by the CPU 120 to manage the order of printing. FIG. 13 illustrates a state where printing reservation information is registered.

Referring to FIG. 13, printing reservation information for a job 1, a job 2, and a job 3 is registered in this order from the left in the print queue, and the CPU 120 reads and executes these jobs in order of printing reservation.

Figure 12:
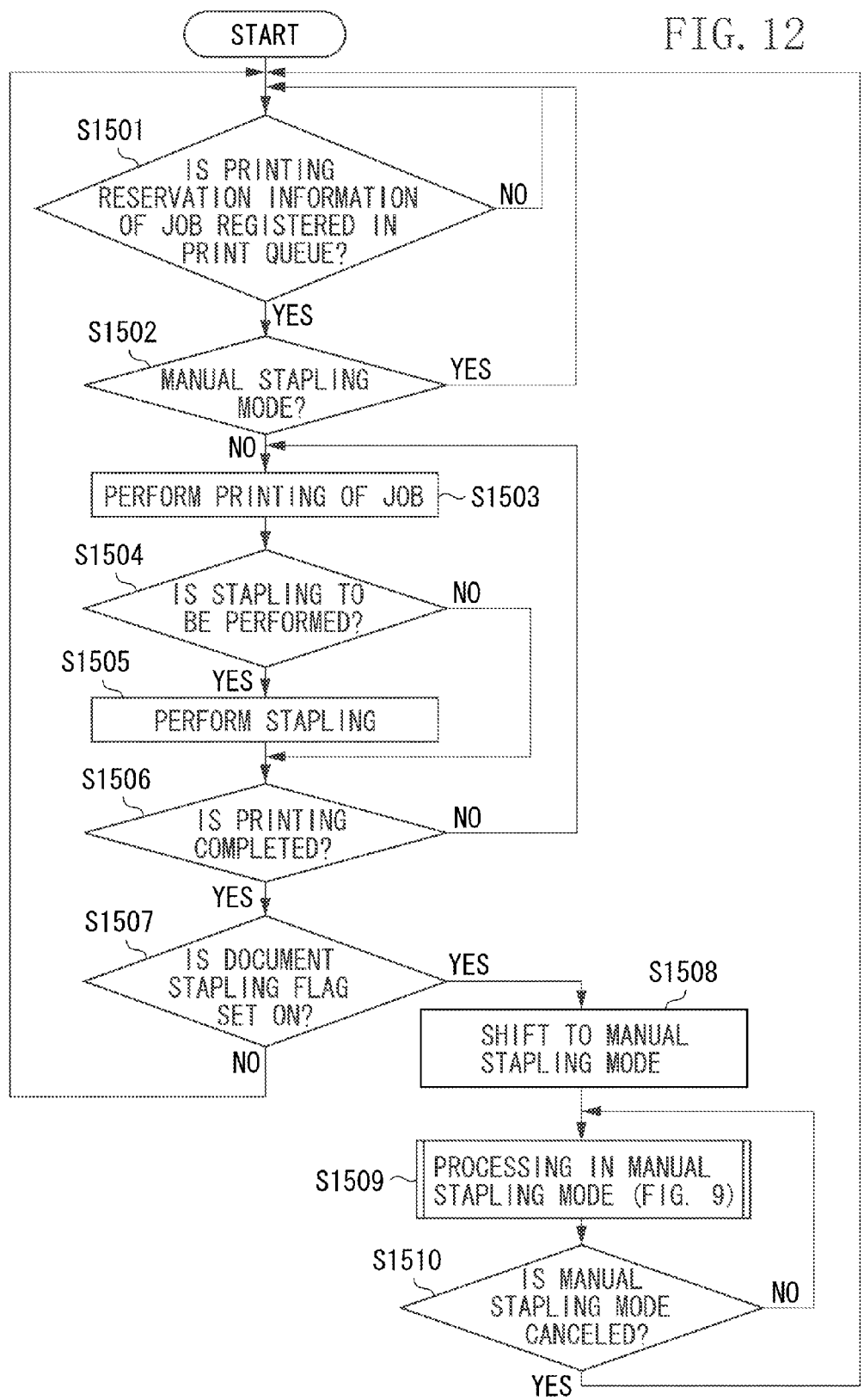
FIG. 12 is a flowchart illustrating processing according to an exemplary embodiment of the present invention.

FIG. 12 is a flowchart illustrating an operation performed by the MFP 100 to perform image printing based on the printing reservation information. The processing of the flowchart illustrated in FIG. 12 is implemented when the CPU 120 reads a program stored in the ROM 160 into the RAM 150, and then executes it.

In step S1501, the CPU 120 determines whether printing reservation information for any job is registered in a print queue. When the printing reservation information is determined to be registered in the print queue (YES in step S1501), the CPU 120 advances the processing to step S1502. On the other hand, when the printing reservation information is determined to be not registered in the print queue (NO in step S1501), the CPU 120 returns the processing in step S1501.

In step S1502, the CPU 120 determines whether the MFP 100 is in the manual stapling mode. When the MFP 100 is determined to be in the manual stapling mode (YES in step S1502), printing cannot be executed, and therefore the CPU 120 returns the processing to step S1501. On the other hand, when the MFP 100 is determined to be not in the manual stapling mode (NO in step S1502), the CPU 120 advances the processing to step S1503.

In step S1503, the CPU 120 controls the printer unit 300 to form an image on a sheet based on the printing reservation information registered in the print queue and the image data stored in the image memory 130.

In step S1504, referring to the printing reservation information received in step S1101 in FIG. 11 and stored in the RAM 150, the CPU 120 determines whether stapling is set to be performed. When stapling is determined to be set to be performed (YES in step S1504), the CPU 120 advances the processing to step S1505. On the other hand, when stapling is determined to be not set to be performed (NO in step S1504), the CPU 120 advances the processing to step S1506.

In step S1505, the CPU 120 instructs the finisher 500 to perform stapling on sheets with printed images.

In step S1506, the CPU 120 determines whether printing for the current job is completed. The CPU 120 repeats image printing and stapling as required until printing for the current job is determined to be completed. When printing for the current job is determined to be completed (YES in step S1506), the CPU 120 advances the processing to step S1507.

In step S1507, the CPU 120 determines whether the document stapling flag in the RAM 150 is set ON. When the document stapling flag is determined to be set ON (YES in step S1507), then in step S1508, the CPU 120 shifts the MFP 100 to the manual stapling mode. On the other hand, when the document stapling flag is determined to be not set ON (NO in step S1507), the CPU 120 returns the processing to step S1501.

In step S1508, the CPU 120 shifts the MFP 100 to the manual stapling mode.

In step S1509, the CPU 120 performs the processing in the manual stapling mode.

In step S1510, the CPU 120 determines whether the manual stapling mode is canceled. The CPU 120 repeats the processing in step S1509 until the manual stapling mode is determined to be canceled. When the manual stapling mode is determined to be canceled (YES in step S1510), the CPU 120 returns the processing to step S1501 to search for printing reservation information for a subsequent job registered in the print queue.

With the above-described control, after removing staples binding a plurality of document sheets, setting the document sheets on the document feeding unit 250, and making the MFP 100 copy the document sheets, the user is able to restore the document sheets to the original state before execution of the subsequent job starts. Even in a case where the user removes staples binding a plurality of document sheets, and places the document sheets between the document feeding unit 250 and the platen glass 211 to make the MFP 100 read the document sheets, the user is able to staple the document sheets after the relevant document copy job is completed and before execution of another job starts.

The example illustrated in FIG. 13 will be described below. By pressing the STAPLE DOCUMENT button 701 when making copy settings for the job 1, the user is able to staple the document sheets before printing for the job 2 reserved after the job 1 starts.

In the above-described first exemplary embodiment, the MFP 100 shifts to the manual stapling mode after completion of a job for reading a document and printing images on sheets based on images of the relevant document, and before execution of another job starts.

In a second exemplary embodiment, the MFP 100 shifts to the manual stapling mode after reading of a document is completed and before printing of images based on images of the relevant document starts. Thus, the user is able to perform stapling on the document sheets at earlier timing.

The configuration of the MFP 100 according to the present exemplary embodiment is similar to that according to the first exemplary embodiment so that detailed descriptions thereof will be omitted.

Figure 14:
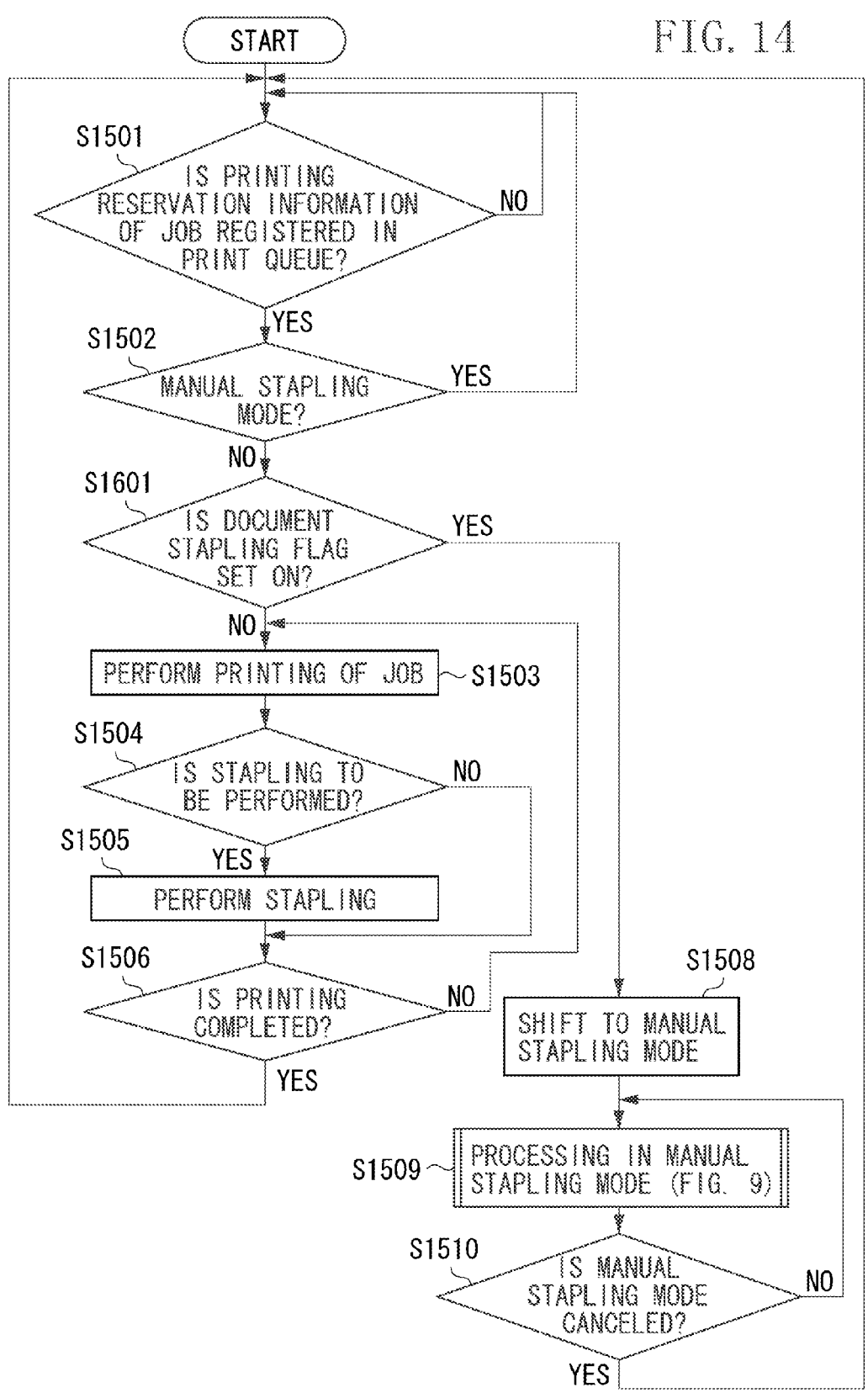
FIG. 14 is a flowchart illustrating processing according to an exemplary embodiment of the present invention.

The second exemplary embodiment differs from the first exemplary embodiment in that it performs processing illustrated in FIG. 14 instead of the processing illustrated in FIG. 12 described in the first exemplary embodiment. Steps illustrated in FIG. 14 performing the same processing as that illustrated in FIG. 12 are assigned the same reference numeral (step number) as those illustrated in FIG. 12.

When printing reservation information for a job is determined to be registered (YES in step S1501) and when the MFP 100 is determined to be not in the manual stapling mode (NO in step S1502), the CPU 120 advances the processing to step S1601.

In step S1601, the CPU 120 determines whether the document stapling flag for the first job in the print queue is set ON. When the relevant document stapling flag is determined to be set ON (YES in step S1601), then in step S1508, the CPU 120 shifts the MFP 100 to the manual stapling mode. On the other hand, when the relevant document stapling flag is determined to be set OFF (NO in step S1601), then in step S1503, the CPU 120 performs printing for the first job.

With the above-described control, after removing staples binding a plurality of document sheets, setting the document sheets on the document feeding unit 250, and making the MFP 100 read the document sheets, the user is able to restore the document sheets to the original state without waiting for completion of printing of images of the document.

In a third exemplary embodiment, the user presets which of the operation described in the first exemplary embodiment and the operation described in the second exemplary embodiment is to be performed.

The configuration of the MFP 100 according to the present exemplary embodiment is similar to that according to the first exemplary embodiment so that detailed descriptions thereof will be omitted.

Figure 15:
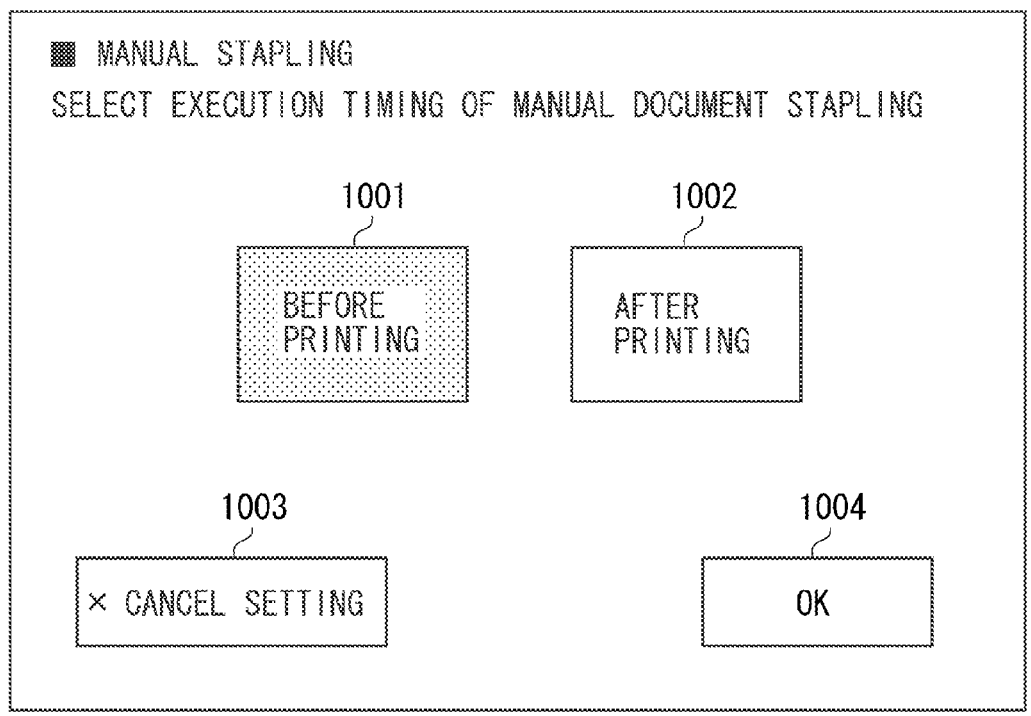
FIG. 15 describes a screen according to an exemplary embodiment of the present invention.

A screen illustrated in FIG. 15 is displayed on the touch panel unit 602 when the USER MODE key illustrated in FIG. 2 is pressed.

The screen illustrated in FIG. 15 includes a BEFORE PRINTING button 1001, an AFTER PRINTING button 1002, a CANCEL SETTING button 1003, and an OK button 1004.

If the user wants to select the operation described in the first exemplary embodiment, the user selects the AFTER PRINTING button 1002 and then presses the OK button 1004.

On the other hand, if the user wants to select the operation described in the second exemplary embodiment, the user selects the BEFORE PRINTING button 1001 and then presses the OK button 1004. If the user wants to cancel the selected button, the user presses the CANCEL SETTING button 1003.

When the OK button 1004 is pressed, the CPU 120 stores information indicating the selected button in the nonvolatile memory 140.

When the AFTER PRINTING button 1002 is pressed in advance, the CPU 120 performs the processing illustrated in FIG. 12 on the printing reservation information registered in the print queue. On the other hand, when the BEFORE PRINTING button 1001 is pressed in advance, the CPU 120 performs the processing illustrated in FIG. 14 on the printing reservation information registered in the print queue.

With the above-described control, the user is able to select whether stapling is to be performed on a document after copying of the document is completed and before execution of the subsequent job starts, or stapling is to be performed on a document after reading of the document is completed and before printing of images of the relevant document starts.

Although, in the above-described exemplary embodiments, stapling is performed on a sheet bundle upon the event that a sheet bundle is detected in step S1001, the present invention is not limited thereto. For example, a button for performing manual stapling may be separately provided, and when this button is pressed, stapling may be performed at the stapling position specified in step S1002.

Although, in the above-described exemplary embodiments, stapling is performed on sheets inserted into the finisher 500 by the user, the present exemplary embodiment is not limited thereto. For example, the following control is also possible. The user stores sheets to be stapled in the sheet feeding unit 310, and inputs the number of sheets for a sheet bundle to be stapled by the operation unit 170. The CPU 120 performs control to feed the number of sheets specified by the user out of the sheets stored in the sheet feeding unit 310. Then, the CPU 120 performs stapling on the sheets fed and stacked in the stack tray 505 without printing images thereon by the marking unit 320. This means that, also in this case, image printing by the printer unit 300 is restricted in the manual stapling mode.

Although, in the above-described exemplary embodiments, stapling is performed as sheet processing (post-processing) performed by the finisher 500, types of sheet processing are not limited thereto, and may be punching, stamp printing, and other post-processing.

Functions illustrated in the flowcharts according to the present exemplary embodiments are implemented when a processing apparatus (a CPU or a processor), such as a personal computer, executes software (programs) acquired via a network and various storage media.

According to the present invention, a mode shift can be specified before execution of a new job to be entered, making it possible to reduce the time period during which the user needs to wait before performing sheet processing.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-121838 filed Jun. 10, 2013, which is hereby incorporated by reference herein in its entirety.

What is claimed is:

1. A printing apparatus comprising:
a printing unit configured to read document images and print images on sheets based on the read images through job execution;
a sheet processing unit configured to convey the sheets with images printed thereon by the printing unit to a sheet processing apparatus, and to make the sheet processing apparatus perform sheet processing on the sheets;
a changing unit configured to, in a state where image printing by the printing unit is restricted, shift the printing apparatus to a mode in which the sheet processing apparatus is instructed to perform sheet processing on the sheets;
a specifying unit configured to, before execution of a new job to be entered, specify a mode shift of the printing apparatus to the mode after completion of printing for a relevant job and before printing for another job starts; and
a control unit configured to, when a mode shift to the mode is specified by the specifying unit, control the printing apparatus to shift to the mode after completion of printing for the relevant job and before printing for the another job starts.

2. The printing apparatus according to claim 1, further comprising:
a selecting unit configured to select either a mode shift of the printing apparatus to the mode after completion of printing for the relevant job and before printing for the another job starts, or a mode shift of the printing apparatus to the mode after completion of document image reading for the relevant job and before printing for the relevant job starts.

3. The printing apparatus according to claim 1, further comprising:
a detecting unit configured to, in a state where the printing apparatus has shifted to the mode, detect that sheets are inserted into the sheet processing apparatus,
wherein, in response to the fact that the detecting unit detects that the sheets are inserted into the sheet processing apparatus, the sheet processing unit further makes the sheet processing apparatus perform post-processing on the relevant sheets.

4. The printing apparatus according to claim 1, further comprising:
an instruction unit configured to, in a state where the printing apparatus has shifted to the mode, specify a position subjected to sheet processing by the sheet processing apparatus,
wherein the sheet processing unit makes the sheet processing apparatus perform sheet processing at the position on the sheets instructed by the instruction unit.

5. The printing apparatus according to claim 1, wherein, when a predetermined time period has elapsed in a state where the detecting unit does not detect sheet insertion and the instruction unit does not specify a position subjected to the sheet processing, printing restriction in the mode is cancelled.

6. The printing apparatus according to claim 1, wherein the specifying unit specifies a mode shift of the printing apparatus to the mode according to an operation received from a user via a setting screen for receiving settings of the new job to be entered.

7. The printing apparatus according to claim 1, wherein the sheet processing is stapling or punching.

8. A printing apparatus comprising:
a printing unit configured to read document images and print images on sheets based on the read images through job execution;
a sheet processing unit configured to convey the sheets with images printed thereon by the printing unit to a sheet processing apparatus, and to make the sheet processing apparatus perform sheet processing on the sheets;
a changing unit configured to, in a state where image printing by the printing unit is restricted, shift the printing apparatus to a mode in which the sheet processing apparatus is instructed to perform sheet processing on the sheets;
a specifying unit configured to, before execution of a new job to be entered, specify a mode shift of the printing apparatus to the mode after completion of document image reading for a relevant job and before printing for the relevant job starts; and
a control unit configured to, when a mode shift to the mode is specified by the specifying unit, control the printing apparatus to shift to the mode after completion of document image reading for the relevant job and before printing for the relevant job starts.

9. A method for controlling the printing apparatus, the method comprising:
reading document images and printing images on sheets based on the read images by a printing apparatus through job execution;

conveying the sheets with images printed thereon by the printing apparatus to a sheet processing apparatus, and making the sheet processing apparatus perform sheet processing on the sheets;

shifting, in a state where image printing by the printing apparatus is restricted, the printing apparatus to a mode in which the sheet processing apparatus is instructed to perform sheet processing on the sheets;

specifying, before execution of a new job to be entered, a mode shift of the printing apparatus to the mode after completion of printing for a relevant job and before printing for another job starts; and controlling, when a mode shift to the mode is specified, the printing apparatus to shift to the mode after completion of printing for the relevant job and before printing for the another job starts.

10. A method for controlling a printing apparatus, the method comprising:

reading document images and printing images on sheets based on the read images by a printing apparatus through job execution;

conveying the sheets with images printed thereon by the printing apparatus to a sheet processing apparatus, and making the sheet processing apparatus perform sheet processing on the sheets;

shifting, in a state where image printing by the printing unit is restricted, the printing apparatus to a mode in which the sheet processing apparatus is instructed to perform sheet processing on the sheets;

specifying, before execution of a new job to be entered, a mode shift of the printing apparatus to the mode after completion of document image reading for a relevant job and before printing for the relevant job starts; and controlling, when a mode shift to the mode is specified, the printing apparatus to shift to the mode after completion of document image reading for the relevant job and before printing for the relevant job starts.

11. A non-transitory computer-readable storage medium storing a program for causing a computer to execute a method for controlling a printing apparatus, the method comprising:

reading document images and printing images on sheets based on the read images by a printing apparatus through job execution;

conveying the sheets with images printed thereon by the printing apparatus to a sheet processing apparatus, and making the sheet processing apparatus perform sheet processing on the sheets;

shifting, in a state where image printing by the printing unit is restricted, the printing apparatus to a mode in which the sheet processing apparatus is instructed to perform sheet processing on the sheets;

specifying, before execution of a new job to be entered, a mode shift of the printing apparatus to the mode after completion of document image reading for a relevant job and before printing for the relevant job starts; and controlling, when a mode shift to the mode is specified, the printing apparatus to shift to the mode after completion of document image reading for the relevant job and before printing for the relevant job starts.

* * * * *